United States Patent
Buck et al.

(10) Patent No.: US 9,284,950 B2
(45) Date of Patent: Mar. 15, 2016

(54) METHOD FOR INSTALLATION OF SENSORS IN ROTOR BLADES AND INSTALLATION APPARATUS

(71) Applicant: Technische Universität München, Munich (DE)

(72) Inventors: Thorbjörn Buck, München (DE); Lars Hoffmann, München (DE); Mathias Müller, München (DE); Rolf Wojtech, München (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 14/405,682

(22) PCT Filed: Jun. 4, 2013

(86) PCT No.: PCT/EP2013/061501
§ 371 (c)(1),
(2) Date: Dec. 4, 2014

(87) PCT Pub. No.: WO2013/182569
PCT Pub. Date: Dec. 12, 2013

(65) Prior Publication Data
US 2015/0113779 A1 Apr. 30, 2015

(30) Foreign Application Priority Data
Jun. 5, 2012 (DE) .......................... 10 2012 104 875

(51) Int. Cl.
*F03D 11/00* (2006.01)
*F03D 3/06* (2006.01)
*G01M 5/00* (2006.01)

(52) U.S. Cl.
CPC ............ *F03D 11/0091* (2013.01); *F03D 3/062* (2013.01); *G01M 5/0091* (2013.01);
(Continued)

(58) Field of Classification Search
CPC .. F03D 11/0091; F03D 3/062; G01M 5/0091; F05B 2270/802; F05B 2270/821; F05B 2270/804; Y10T 29/37; Y10T 29/49336; Y02E 10/722; Y02E 10/721
See application file for complete search history.

(56) References Cited

U.S. PATENT DOCUMENTS 5,782,003 A * 7/1998 Bozzo .................. G01C 15/004
33/285
6,763,595 B1 * 7/2004 Hersey ................. G01C 15/004
33/286

(Continued)

FOREIGN PATENT DOCUMENTS

DE    202007008066 U1    10/2008
EP        2362094 A2     8/2011

(Continued)

OTHER PUBLICATIONS

Written Opinion mailed Aug. 4, 2013 for PCT Application No. PCT/EP2013/061501.

(Continued)

Primary Examiner — Ryan J Walters
(74) Attorney, Agent, or Firm — Moser Taboada (57) ABSTRACT

The present invention provides a method for installing at least one sensor device within a rotor blade of a wind turbine. A first substantially planar light beam is emitted in the interior of the rotor blade. Finally, at least one second substantially planar light beam is emitted in the interior of the rotor blade, wherein the plane of the first planar light beam is oriented at a predetermined angle to the plane of the second planar light beam. Further, the planes of the first and second planar light beams are aligned on the blade flange of the rotor blade. At least one sensor device is subsequently aligned in reference to the planar light beams.

17 Claims, 5 Drawing Sheets

(52) U.S. Cl.
CPC ..... *F05B2270/802* (2013.01); *F05B 2270/804* (2013.01); *F05B 2270/821* (2013.01); *Y02E 10/721* (2013.01); *Y02E 10/722* (2013.01); *Y02P 70/523* (2015.11); *Y10T 29/37* (2015.01); *Y10T 29/49336* (2015.01)

(56) References Cited

U.S. PATENT DOCUMENTS

2010/0121606 A1* 5/2010 Vestergaard ............ F03D 3/062 702/167

2011/0204542 A1* 8/2011 Flach ...................... B23B 47/28 264/154

FOREIGN PATENT DOCUMENTS

| WO | WO2008092461 A1 | 8/2008 |
| WO | WO-2008092461 A2 | 8/2008 |
| WO | WO2012000714 A1 | 1/2012 |

OTHER PUBLICATIONS

International Search Report and IPRP dated Aug. 28, 2013 for PCT/EP2013/061501.

* cited by examiner

METHOD FOR INSTALLATION OF SENSORS IN ROTOR BLADES AND INSTALLATION APPARATUS

FIELD OF THE INVENTION

The present invention relates to the monitoring of the operation of wind turbines, in particular the monitoring of bending moments in rotor blades of wind turbines, and a method for installation of sensor units within rotor blades, where said sensor units can monitor bending moments. Furthermore, the present invention relates to an installation apparatus for installing at least one sensor unit within a rotor blade of a wind turbine.

STATE OF THE ART

Wind turbine monitoring systems which can detect blade bending moments of rotor blades are becoming increasingly important. In particular, fiber optic strain gauges may be used, which are bonded to the root of the rotor blade for such measurements. The accuracy of such measurements is largely dependent on the exact positioning of such fiber optic strain gauges, both in the axial direction and in the circumferential direction of the rotor blade.

The installation of a sensor on the interior of the rotor blades of a wind turbine is a complex procedure due to environmental conditions such as darkness, dangerous and/or difficult to access installation space, contamination, etc. To install a rotor blade measurement system, the operation of the wind turbine must be interrupted, resulting in a loss of earnings, potentially in combination with high costs. Determining a suitable sensor location for one or more strain gauges within the rotor blade according to conventional methods is also extremely time-consuming, which results in additional costs. Further, highly precise positioning of the sensors during installation is required.

SUMMARY OF THE INVENTION

According to one embodiment of the invention, a method for installing at least one sensor unit within a rotor blade of a wind turbine, the method comprising emitting a first substantially planar light beam in the interior of the rotor blade, emitting at least a second substantially planar light beam in the interior of the rotor blade, wherein the plane of the first planar light beam is oriented at a predetermined angle to the plane of the second planar light beam, and wherein the planes of the first and second beams of light are aligned with the blade flange of the rotor blade, and an alignment of at least one sensor unit in reference to said planar light beams.

According to one embodiment of the invention, an installation apparatus for installation of at least one sensor unit within a rotor blade of a wind turbine is provided, wherein the installation apparatus comprises a holding device which is adapted for attachment to a blade flange of a rotor blade, a first laser line emission device attached to said holding device adapted for emitting a first substantially planar light beam in the interior of the rotor blade, a second laser line emission device attached to said holding device adapted for emitting a second substantially planar light beam in the interior of the rotor blade, and an alignment device for alignment of the holding device on an angular coordinate of the blade flange.

BRIEF DESCRIPTION OF THE DRAWINGS

Exemplary embodiments are illustrated in the drawings and explained in detail in the following description. In the drawings.

In the drawings, identical reference numerals designate identical or functionally identical components or steps.

DETAILED DESCRIPTION OF THE INVENTION

In the following, detailed references to the various embodiments of the invention will be made, wherein one or more examples are illustrated in the drawings.

Embodiments of the present invention described herein relate to, amongst others, a method for the installation of at least one sensor unit within a rotor blade of a wind turbine. The method involves an emission of a first substantially planar light beam in the interior of the rotor blade, wherein said planar light beam is emitted from the blade flange of the rotor blade. Furthermore, at least a second substantially planar light beam is emitted in the interior of the rotor blade, wherein laser line emission devices are provided centrally on the blade flange for producing said first and second planar light beams. The plane of the first planar light beam is oriented at a predetermined angle to the plane of the second planar light beam, wherein the planes of the first and second planar light beams are in turn aligned with the blade flange of the rotor blade. The two planar light beam planes may further extend in a direction parallel to the rotor blade axis. Further, an alignment of the at least one sensor unit in reference to the planar light beams or in reference to the laser light lines which are projected by the planar light beams in the interior of the rotor blade on the inner surfaces of the rotor blade is effected.

Moreover, embodiments of the present invention described herein relate to an installation apparatus for installation of at least one sensor unit within the rotor blade of a wind turbine. The installation apparatus comprises a holding device adapted for attachment to a blade flange of the rotor blade. A first laser line emission device attached to said holding device is provided to emit a first substantially planar light beam in the interior of the rotor blade. Further, a second laser line emission device attached to said holding device is provided to emit a second substantially planar light beam in the interior of the rotor blade. An alignment device is provided for the alignment of the holding device on an angular coordinate of the blade flange. Thus, a sensor position in a circumferential direction in the interior of the rotor blade can be determined. A sensor position in an axial direction i.e. a distance from, for example, the blade flange to a sensor unit attached to the inner surface of the rotor blade, can then be determined with a separate distance measuring apparatus in a simple manner.

Figure 1:
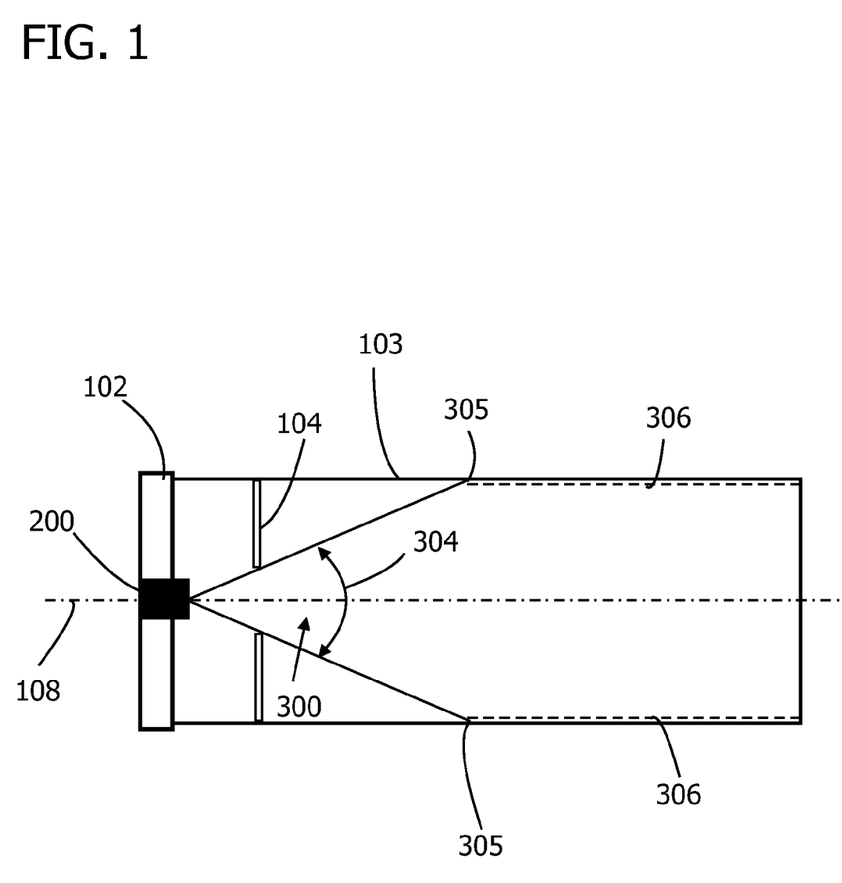
FIG. 1 is a cross-sectional side view of a rotor blade with attached laser line emission devices for providing a planar light beam.

FIG. 1 is a cross-sectional side view of a rotor blade 103 having a blade flange 102 and a blade bulkhead 102. An emission device 200 is arranged substantially central on a rotor blade axis 108 on the position of the blade flange 102. Alternatively, the emission device 200 may be arranged at a predetermined distance from the rotor blade axis 108. The emission device may be in the form of a laser line emission device 200, which emits a planar light beam 300. The planar light beam 300 has a beam angle 304 restricted by, for example, the blade bulkhead 104. The beam angle 304 defines a point of incidence 305 of the edge rays of the planar light beam 300 on the inner surface of the rotor blade 103. Originating from the respective point of incidence 305 of the laser light on the inner surface of the rotor blade 103, light lines 306 are made visible on the inner surface of the rotor blade 103 along which sensors, as described below with reference to FIG. 2, can be aligned and subsequently installed. Thus, the light lines 306 provide an aid for determining a circumferential position for the sensor units to be mounted, such as fiber optic strain gauges.

It should be noted, that sensor units for detecting bending moments of the rotor blade 103 are arranged substantially in the vicinity of the blade flange 102, wherein the rotor blade 103 in the vicinity of the blade flange 102 is approximated by a cylinder or truncated cone. In other words, the planar light beam 300 projects the light lines 306 on the inner surface of the rotor blade, which can be used for the adjustment and attachment of sensors. As explained in the description below with reference to FIG. 4, the blade bulkhead 104 of the rotor blade 103 may be irradiated by one or more planar light beams, wherein the planes of said planar light beams are angularly displaced from one another.

The blade bulkhead 104 may more or less restrict the beam angle 304 of the planar light beam 300, depending on the diameter of the opening. In addition, it is possible to variably adjust the expansion (of beam angle 304) of the planar light beam 300 by the use of an aperture device, which is symmetrically arranged in a central position with respect to the axis 108 of the rotor blade 103.

The adjustment of the beam angle 304 of a planar light beam according to one embodiment, which may be combined with other embodiments described herein, may produce a beam angle of at least 100°, in particular a beam angle in a range from 120° to 140°. A maximum beam angle 304 is given by the size of the opening in the blade bulkhead 104 of the rotor blade 103.

Figure 2:
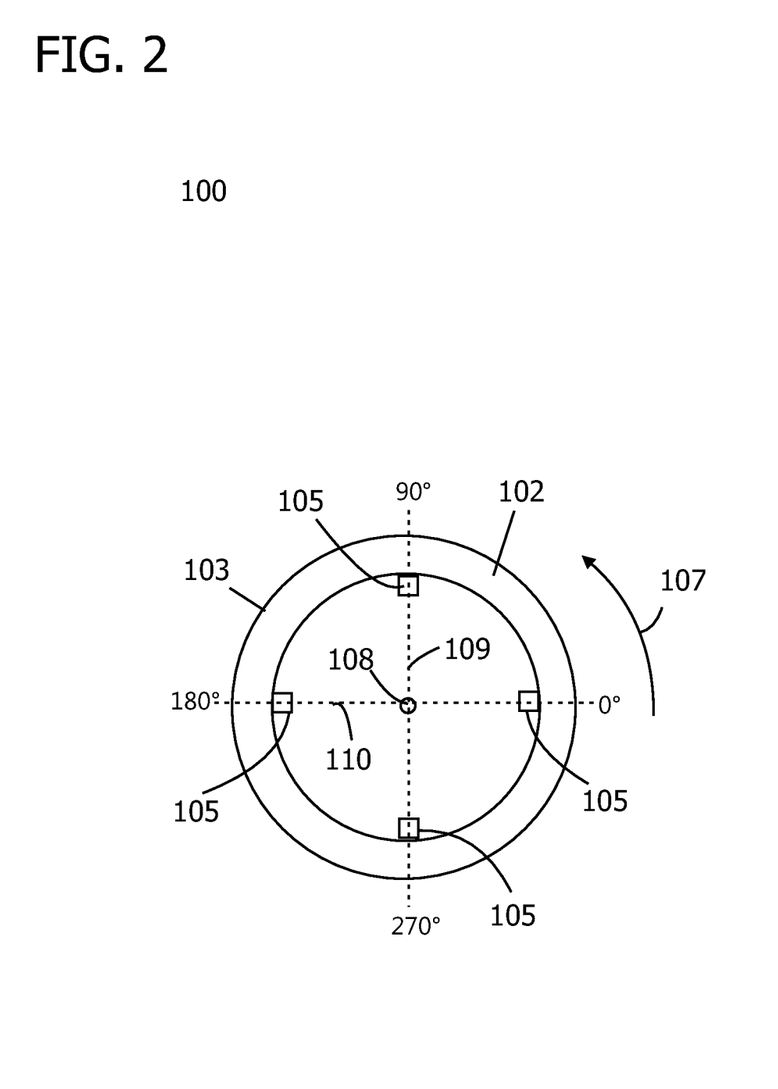
FIG. 2 is a cross-sectional view perpendicular to an axis of a rotor blade at the position of the blade flange.

According to one embodiment, which may be combined with other embodiments described herein, at least one planar light beam 300 is emitted from a holding device 101, which is centrally or substantially centrally attached to the blade flange 102. A sensor unit, which is to be installed for detecting bending moments of the rotor blade 103, may henceforth be aligned along at least one light line 306 in a longitudinal direction of the rotor blade 103 at a predetermined distance from the blade flange 102 of the rotor blade 103. As shown in FIG. 2, two planar light beams oriented perpendicular to one other, having a first planar light beam plane 109 and a second planar light beam plane 110, are provided for the alignment of four sensors 105, which are distributed in a circumferential direction of the rotor blade 103 in the 0° position, 90° position, 180° position and 270° position, respectively. The first planar light beam plane 109 determines the circumferential positions 90° and 270° for installation of the sensors 105, while the second planar light beam plane 110 determines the circumferential positions 0° and 180° for the installation of sensors 105.

As shown in FIG. 2, the first and second planar light beam planes 109, 110 are oriented perpendicular to one another. It should be noted, however, that the planar light beam planes 109, 110 may be oriented at any angle to one another, according to the desired circumferential positions of the sensors 105. Further, it is possible to provide more than two planar light beam planes or only one planar light beam plane in the interior of the rotor blade 103, such that a predetermined number of sensors 105 can be circumferentially aligned.

In the arrangement shown in FIG. 2, the plane of the first planar light beam 109 is oriented approximately perpendicularly to the plane of the second planar light beam 110, i.e. the predetermined angle between the plane of the first planar light beam 109 and the plane of the second planar light beam 110 is approximately 90°. This has the advantage that four sensor units 105 may be precisely arranged in the interior of the rotor blade 103.

Figure 3:
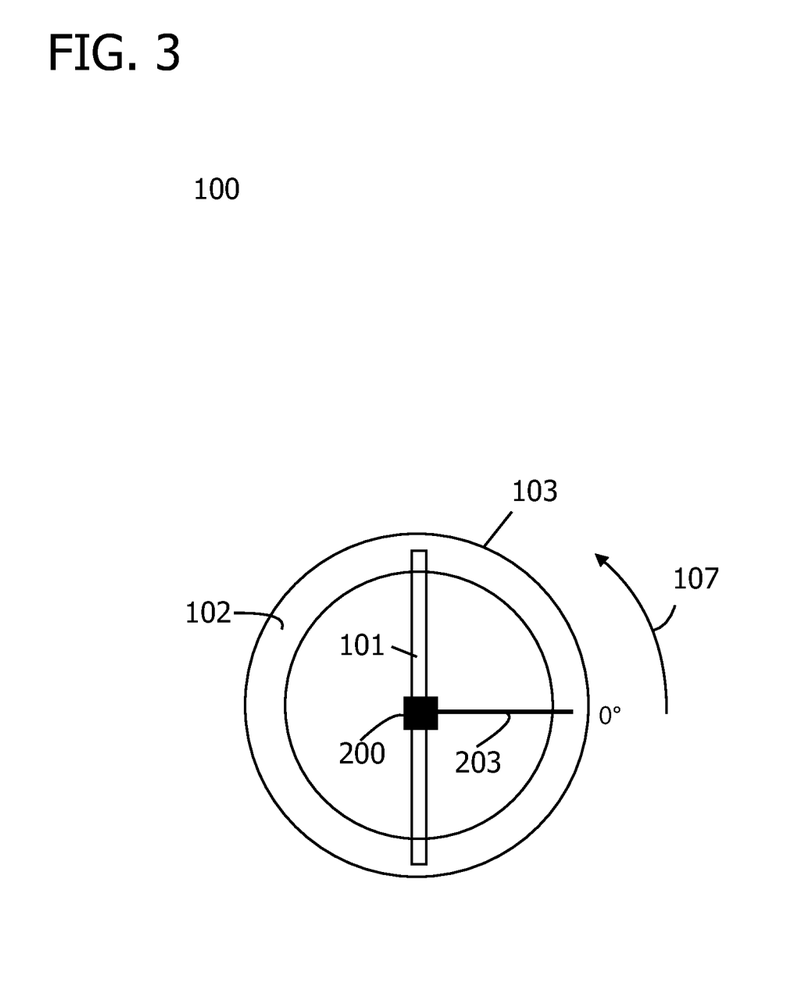
FIG. 3 is another cross-sectional view of the blade flange with an attached holding device for the laser line emission devices.

FIG. 3 shows a top view of the blade flange 102 of the rotor blade 103, with a holding device 101 for the optical emission device 200 mounted thereon. Here, the holding device 101 is aligned circumferentially in relation to an angular coordinate 107. In conjunction with the alignment device 203 as shown in FIG. 2, it is possible to establish a reference in the circumferential direction, for example, the 0° angular coordinate 107. For this purpose, according to one embodiment, which may be combined with other embodiments described herein, the alignment device 203 is in the form of an alignment rod, which is attached perpendicular to the longitudinal direction of the holding device 101.

According to a further embodiment, the alignment device 203 may be in the form of a collimated laser, which directs a line of laser light (spot laser) from the emission device 200 to the edge of the blade flange 102, such that the emission device can be aligned to the 0° angular coordinate 107. At the base of the rotor blade on the spinner or hub, an angular orientation based on a 0° marking can be established. As described above in reference to FIG. 1, the rotor blade 103 is separated from the hub by a blade bulkhead 102, which is provided with a hatch for entry into the blade. For the installation of sensor units in the blade root, in other words, in the interior of the rotor blade 103 behind the blade bulkhead 103, said 0° angular coordinate 107, and several other positions depending on the sensor configuration, are propagated to the easy to determine axial sensor position at a fixed angle relative to this angular position.

Finally, it is possible to bond the sensors, for example fiber optic strain gauges, to the blade root. Thus, an alignment and position of the sensors, both axially and angularly, is made possible with high precision. The strain data measured by the sensors allows for precisely determining the blade bending moment. The method for installing sensor units within the rotor blade 103 enables the fast and inexpensive positioning of sensors with a small expenditure of time, and the alignment within the rotor blade 103 of a wind turbine. Here, the positioning is based on the projection of an easily determined coordinate system, that is the 0° marking and additional perpendicular axis, at the base of the blade in the interior of the rotor blade 103 of a wind turbine, behind the blade bulkhead 102. The alignment device 203 as shown in FIG. 3 is thus an efficient marking device, which is adapted for determining a reference position of the at least one planar light beam in the circumferential direction of the rotor blade 103.

According to a further embodiment, which may be combined with other embodiments described herein, the holding device 101 is adjustable in length in such a manner to suit the diameter of the blade bulkhead 102. In this case, the holding device 101 is, for example after an adjustment with assistance from the adjustment device 203, clampable to the blade flange 102. Hence, the holding device 101 can be adjusted on the blade flange 102 to an angular coordinate 107, particularly to the angular coordinate 107 of approximately 0° by means of the adjustment device 203 which is, for example, in the form of a spot laser or an adjustment rod. In this case, the holding device 101 may have a variable length in a range from 1.8 m to 4 m. The first and/or second laser line emission device, alternatively the emission device 200, is in this case attached substantially centrally on the holding device 101, i.e. in the area of the rotor blade axis 108 (see FIG. 2). Subsequently, adjusting the length of the holding device 101 in the preferred manner does not affect the substantially central alignment.

According to one embodiment, the holding device 101 may consist of a variable-length rod, which is positioned at the blade root at a point of maximum diameter. At the midpoint of said variable-length rod, an outward-pointing device is provided perpendicular to the rod, which is aligned with the 0° marking of the rotor blade. Said device may be of a mechanical nature, for example, implemented by another variable-length rod, an adjustment rod or an alignment device 203, or realized by an optical marker, for example, a point laser. The described arrangement is therefore oriented such that the resulting tripod defines the coordinate system of the rotor blade 103 at the blade root, and additionally marks the center point or another desired position of the resulting conic section at least approximately. By aligning relative to the rotor blade flange, an installation can be performed independent of the rotor blade position (pitch).

Figure 4:
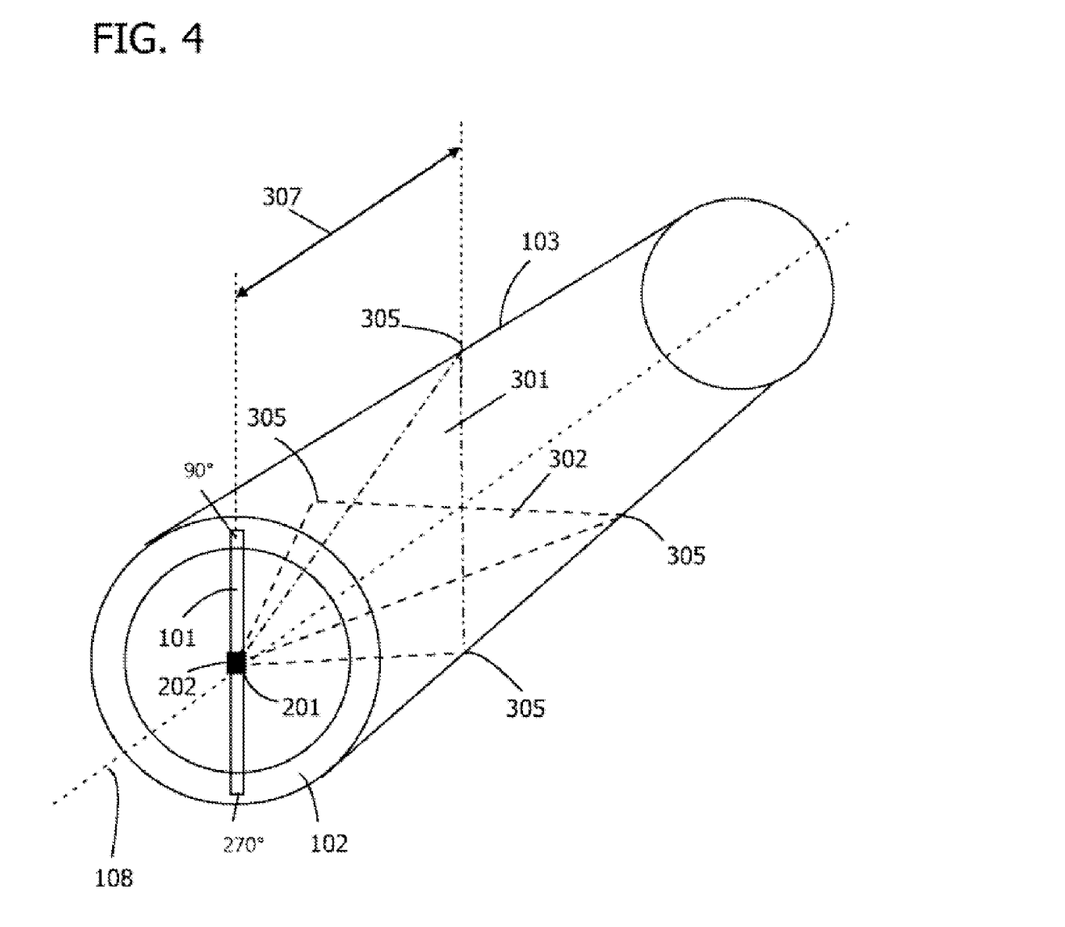
FIG. 4 is a perspective view of a rotor blade with depiction of two planar light beams emitted perpendicular to one another.

FIG. 4 shows a perspective view of a rotor blade 103 with a holding device 101 for the optical emission device 200 attached to blade flange 102. As shown in FIG. 4, the holding device is fixed to the blade flange 102 in a specific position, aligned in the 90°-270° direction in the example shown. In this case, the emission device 200, which may consist of a first laser line emission device 201 for emitting a first planar light beam 301 (chain dotted lines in FIG. 4) and a second laser line emission device 202 for emitting a second planar light beam 302 (dashed lines in FIG. 4), is attached centrally in the area of the rotor blade axis 108.

The two planar light beams 301, 302 are in this case fixed along the rotor blade axis 108 and are oriented approximately perpendicular to one another. Thus, there are four points of incidence or projected lines 305 of the laser light lines in the circumferential direction of the rotor blade 103. Originating from the point of incidence 305 and projecting away from blade flange 102, light lines (laser light lines) are hence formed along the inner surface of the rotor blade 103, so that sensors 105 (see FIG. 2) may be aligned along these light lines. The axial alignment of the sensors may be accomplished with the aid of a distance measuring device, which defines an axial distance 307 measured, for example, from the front side of the blade flange 102 or from the blade bulkhead 104.

According to a further embodiment, which may be combined with other embodiments described herein, the two planar light beams may have different wavelengths, such that the first laser line emission device emits a first wavelength, while the second laser line emission device emits a second wavelength different to the first wavelength. The arrangement with different wavelengths has the advantage that the laser lines are easily discernable from one another around the circumference, also in unfavourable environmental conditions. This is particularly important when more than two planar light beams in the interior of the rotor blade 103 are projected, for example, in the case where more than four sensors 105 must be attached circumferentially on the inside (inner surface) of the rotor blade 103.

It should be noted that the emission device 200 may consist of separate first and second laser line emission devices 201, 202, where each laser line emission device 201, 202 respectively produces an individual planar light beam 301, 302 respectively. Further, it is possible that the first laser line emission device 201 and the at least one second laser line emission device 202 are combined together in a common device, for example, combined in the emission device 200.

Although the operation of the described installation apparatus for the installation of at least one sensor unit 105 within a rotor blade 103 of a wind turbine is not limited to a cylindrical inner surface of the rotor blade 103 as shown in FIG. 4, the section of the rotor blade 103 at least near the flange is depicted as approximately cylindrical for simplification of the illustration. However, according to further embodiments, it is possible that the rotor blade 103 has a non-circular cross section, and hence the form of the entire rotor blade 103 may be a non-cylindrical shape. Further, for clarity of the illustration in FIG. 4, the blade bulkhead 104 of the rotor blade 103 as shown in FIG. 1 and the alignment device 203 as shown in FIG. 3 have been omitted.

It should be noted that the beam angle 304 is specified either through the blade bulkhead 104 (FIG. 1) or through another arrangement within the first and second laser line emission devices 201, 202. Hence, the emission device 200 may have the first line laser emission device 201 attached to the holding device 101, which is adapted for emitting the first substantially planar light beam 301 in the interior of the rotor blade 103. Further, the emission device 200 may have the at least second line laser emission device 201, which is adapted for emitting the second substantially planar light beam 301 in the interior of the rotor blade 103.

The, for example, emission device 200 attached substantially centrally on the holding device 101 (variable length rod, see above) may hence emit at least two planar light beams in the direction of the blade interior, in the direction normal to the plane spanned by the tripod of holding device 101 and alignment device 203. The planar light beams traverse the opening of the blade bulkhead 104 and project defined angular positions in the axial direction of the blade, by means of the configured orientation of the light beams. By simple determination of the axial distance of the sensor position from the blade bulkhead 104, and extension of the projected angular positions and directions, the sensor position may be determined in a simple and efficient manner.

It can be shown, for example, in test installations, that alignment times of less than 15 minutes are possible for determining the sensor positions with the help of the described installation apparatus. This represents a significant time saving in comparison to a conventional installation operation. In the case of a reference installation based on a conventional installation operation, without using the installation apparatus described above with reference to various embodiments, the time required for determining the corresponding sensor positions is estimated at approximately 2 hours.

Figure 5:
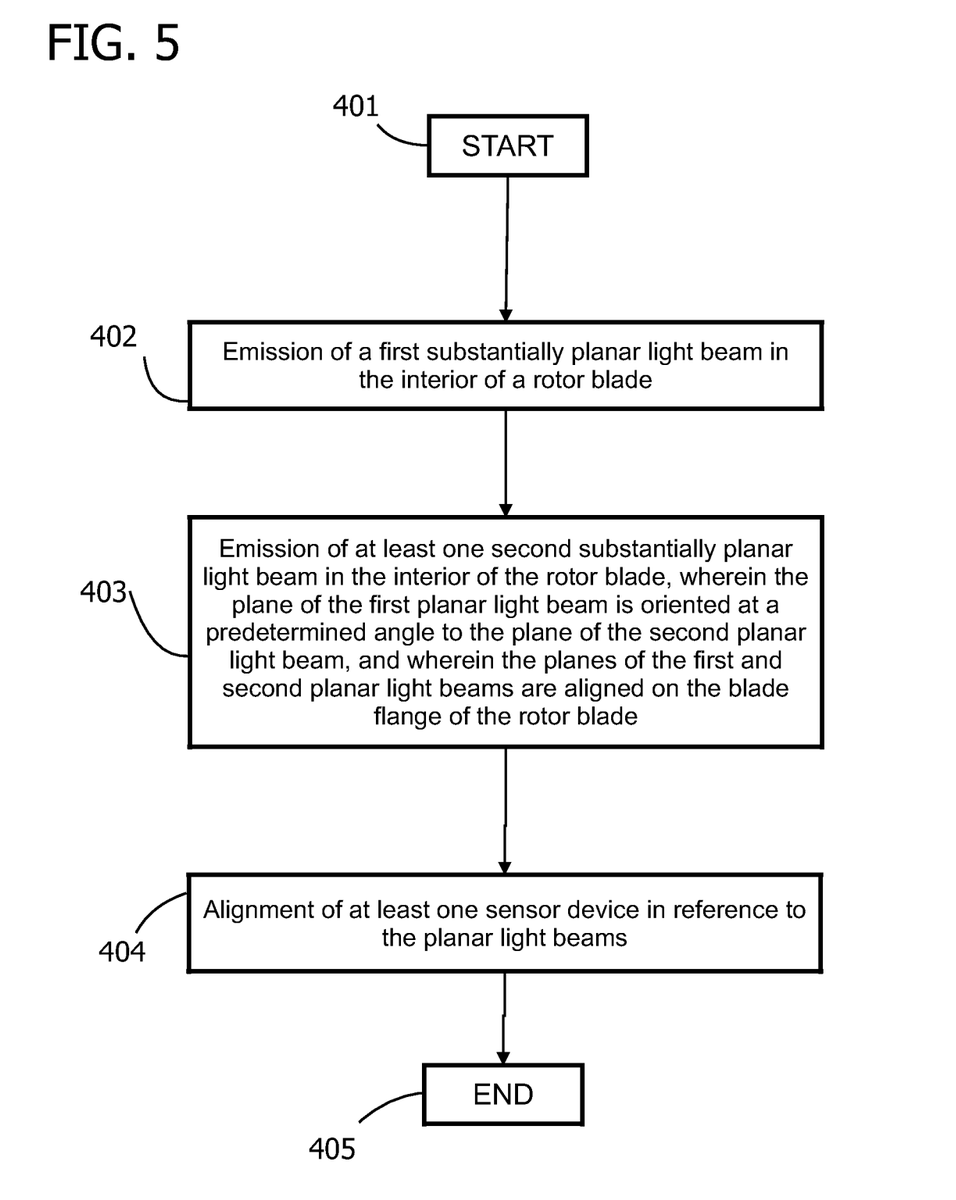
FIG. 5 is a flow diagram which demonstrates a method for installing a sensor unit within a rotor blade of a wind turbine.

FIG. 5 is a flow diagram demonstrating a method for installing at least one sensor device 105 within a rotor blade 103 of a wind turbine. The procedure begins with a block 401. Then, in a block 402, a first substantially planar light beam 301 is radiated (emitted) in the interior of a rotor blade 103.

In a block 403, at least a second substantially planar light beam 302 is emitted in the interior of the rotor blade 103, where the plane of the first planar light beam 301 is oriented at a predetermined angle to the plane of the second planar light beam 302. Here, the planes of the first and second planar light beams 301, 302 are further aligned with the blade flange 102 of the rotor blade 103. At least one sensor device 105 may then be aligned in reference to the planar light beams 301, 302 (block 404). The procedure concludes in a block 405.

Although the present invention has been described above with reference to typical embodiments, it is not limited thereto, but may be modified in many ways. The invention is also not limited to these applications.

The invention claimed is:

1. A method for the installation of at least one sensor device within a rotor blade of a wind turbine, comprising:
   emission of a first substantially planar light beam in the interior of the rotor blade;
   emission of at least a second substantially planar light beam in the interior of the rotor blade;
   wherein the plane of the first planar light beam is oriented at a predetermined angle to the plane of the second planar light beam, and wherein the planes of the first and second planar light beams are aligned on a blade flange of the rotor blade; and alignment of the at least one sensor device in reference to the planar light beams.

2. The method according to claim 1, wherein the at least one planar light beam is emitted from a holding device attached substantially centrally to the blade flange.

3. The method according to claim 2, wherein the holding device is adjustable in length.

4. The method according to claim 3, wherein the holding device has a length in a range from about 1.8 m to about 4 m.

5. The method according to claim 2, wherein the holding device is aligned to an angular coordinate on the blade flange.

6. The method according to claim 2, wherein the holding device is aligned to an angular coordinate of approximately 0° by a point laser or adjustment rod.

7. The method according to claim 1, wherein the holding device is clamped in the blade flange.

8. The method according to claim 1, wherein the at least one sensor device is aligned in reference to a longitudinal direction of the rotor blade along at least one light line produced by a planar light beam at a predetermined distance from the blade bulkhead of the rotor blade.

9. The method according to claim 1, wherein a beam angle of at least one planar light beam is variably adjusted, or wherein the beam angle is at least 100°.

10. The method according to claim 9, wherein the beam angle is in a range from 120° to 140°.

11. The method according to claim 1, wherein a beam angle of at least one planar light beam is variably adjusted, and wherein the beam angle is at least 100°.

12. The method according to claim 11, wherein the beam angle is in a range from 120° to 140°.

13. An installation apparatus for installation or at least one sensor device within a rotor blade of a wind turbine, comprising:
   a holding device, which is adapted for attachment to a blade flange of a rotor blade;
   a first laser line emission device attached to the holding device, which is adapted for emitting a first substantially planar light beam in the interior of the rotor blade;
   a second laser line emission device attached to the holding device, which is adapted for emitting a second substantially planar light beam in the interior of the rotor blade; and
   an alignment device for aligning the holding device to an angular coordinate of the blade flange.

14. The installation apparatus according to claim 13, wherein the holding device has a variable length in a range from 1.8 m to 4 m.

15. The installation apparatus according to claim 13, wherein the first and/or second laser line emission device are arranged substantially centrally.

16. The installation apparatus according to claim 13, wherein the planar light beam of the first and/or second laser line emission device has a beam angle of at least 100°.

17. The installation apparatus according to claim 16, wherein the beam angle is in a range from 120°140°.

* * * * *